United States Patent
Nesbitt et al.

[11] Patent Number: 6,030,312
[45] Date of Patent: Feb. 29, 2000

[54] MOTOR VEHICLE POWER TRAIN

[75] Inventors: David Charles Nesbitt; David John Tickle, both of Leamington Spa; Clive David Woolmer, Coventry; John Samuel Ebrey, Redditch, all of United Kingdom

[73] Assignee: Rover Group Limited, Warwick, United Kingdom

[21] Appl. No.: 09/194,690

[22] PCT Filed: Jun. 5, 1997

[86] PCT No.: PCT/GB97/01515

§ 371 Date: Nov. 30, 1998

§ 102(e) Date: Nov. 30, 1998

[87] PCT Pub. No.: WO97/46406

PCT Pub. Date: Dec. 11, 1997

[30] Foreign Application Priority Data

Jun. 6, 1996 [GB] United Kingdom ................. 9611855

[51] Int. Cl.⁷ ............................................. B60K 17/346
[52] U.S. Cl. ........................ 477/35; 475/201; 475/202; 475/205; 180/248; 74/665 GC
[58] Field of Search ............................ 180/248; 475/206, 475/205, 204, 200, 201, 202; 74/665 G, 665 GA, 665 GB, 665 GC, 665 GE, 665 T, 665 K

[56] References Cited

U.S. PATENT DOCUMENTS

| 3,235,021 | 2/1966 | Hill .......................................... 180/249 |
| 4,671,136 | 6/1987 | Katayama ............................... 475/205 |
| 4,756,381 | 7/1988 | Renaudin ................................ 180/249 |
| 4,805,720 | 2/1989 | Clenet .................................... 180/248 |
| 5,640,882 | 6/1997 | Mueller ..................................... 73/359 |
| 5,704,866 | 1/1998 | Pritchard et al. ................... 180/248 X |

FOREIGN PATENT DOCUMENTS

| 0 177 286 A2 | 4/1986 | European Pat. Off. . |
| 0 179 991 A2 | 5/1986 | European Pat. Off. . |
| 0 236 178 A1 | 9/1987 | European Pat. Off. . |
| 0 683 065 A1 | 11/1995 | European Pat. Off. . |
| 2 695 880 A1 | 3/1994 | France . |
| 118233 | 5/1991 | Japan ..................................... 180/248 |
| 453838 | 9/1936 | United Kingdom . |
| 860546 | 2/1961 | United Kingdom . |
| 1191676 | 5/1970 | United Kingdom . |

*Primary Examiner*—Charles A. Marmor
*Assistant Examiner*—Ankur Parekh
*Attorney, Agent, or Firm*—Davis and Bujold

[57] ABSTRACT

A motor vehicle power train includes an engine (26) mounted longitudinally near the front of the vehicle and a transmission assembly (35) mounted intermediate front and rear differentials (17, 18). The transmission assembly is connected to the engine through an input propshaft (31), to the front differential through a front propshaft (37) and to the rear differential through a rear propshaft (38). The transmission assembly comprises a change speed transmission (28) which receives drive from the input propshaft and a hollow output shaft (49), a transfer transmission comprising a center differential (30) which is drivably connected to the hollow output shaft, has a front differential output shaft (54) for transmitting drive to the front propshaft and a rear differential output shaft (56) for transmitting drive to the rear propshaft, one of the differential output shafts (54) extending co-axially through the hollow output shaft. The transmission assembly also comprises an auxiliary output transmission (39) in the drive from the front differential output shaft to the front propshaft, the transmission assembly being arranged so that front and rear rotary outputs (37B, 38B) to the front and rear propshafts are axially offset from a rotary input (33) from the input propshaft, the front rotary output by an amount greater than that of the rear rotary output. The change speed transmission is conveniently adapted from a known automatic transmission for front wheel drive vehicles and can be connected using an input transmission (34).

20 Claims, 8 Drawing Sheets

Fig. 10

MOTOR VEHICLE POWER TRAIN

The invention relates to motor vehicle power trains and is particularly concerned with power trains of four wheel drive vehicles of the type which have a longitudinally mounted engine.

Known power trains of conventional four wheel drive vehicles typically comprise a change speed transmission mounted axially in line with the engine and a transfer transmission which is mounted directly on the change speed transmission to drive front and rear differentials through propshafts offset from the engine and the change speed transmission. Alternatively, a separate transfer transmission is spaced from the change speed transmission and connected to it through a short universally jointed propshaft.

Packaging of power trains in motor vehicles is of increasing importance particularly as vehicles become more compact and available space decreases. This creates a conflict for the vehicle designer between providing adequate accommodation for the driver and passengers and mounting the power train components in an arrangement most appropriate for their function of driving the vehicle.

A power train is described in FR-A-2 695 880 which shows a transmission which is intended for a sports car and the object is to move the weight of the transmission assembly close to the rear wheels so that there is a balanced distribution of load between the two axles of the vehicle. To fulfil this object of weight distribution, FR-A-2 695 880 couples the transmission assembly directly to the rear differential casing so that the rear output from the center differential is taken directly by the bevel pinion shaft. This causes more problems in providing adequate accommodation for the passengers and luggage and adds to the polar moment of inertia of the vehicle, affecting ride and handling.

An object of the present invention is to provide a motor vehicle power train which helps to optimize the available space without any of the disadvantages outlined above.

According to one aspect of the invention a power train for a motor vehicle is characterised in that the transmission assembly is separate from the rear differential and placed at or near the center of the vehicle and is spaced from the rear differential by a rear propshaft which drivably connects the rear differential to the rear rotary output.

The change speed transmission may be coaxial with the hollow output shaft, an input transmission being adapted to transmit drive from the drive input to the input shaft of the change speed transmission, in which case the input transmission and the auxiliary output transmission are conveniently arranged at the same end of the transmission assembly. This arrangement is particularly suitable where the change speed transmission is an epicyclic type automatic transmission or a toroidal type CVT.

Alternatively, the change speed transmission may be a layshaft type having an input shaft coaxial with the rotary input and axially offset from the hollow output shaft. This arrangement is particularly suitable where the change speed transmission is a constant mesh type, e.g. sychromesh or is a belt and pulley type CVT.

The transfer transmission may include an epicyclic final drive having a sun gear connected to the hollow output shaft and a planet gear carrier for transmitting drive to the center differential, in which case the epicyclic final drive may provide a plurality of selectable ratios.

In one arrangement according to the invention the transmission assembly is spaced from the engine, the rotary input being connected to the engine by an input propshaft, in which case a drive coupling (e.g. torque converter or friction clutch) in the drive between the engine and the transmission assembly can be mounted on the engine so as to be operable to transmit drive to the transmission assembly through the input propshaft. A bell housing for the drive coupling can be mounted on the engine and, as an alternative to independent mounting of the engine and the transmission assembly, the bell housing and the transmission assembly can be connected by a tubular housing which surrounds the input propshaft.

Alternatively, and especially conveniently where the change speed transmission is an automatic epicyclic type, the transmission assembly can comprise a drive coupling (particularly a torque converter) in the drive between the engine and the change speed transmission. In that case, where the drive coupling is a torque converter a pump for the change speed transmission is conveniently located on the opposite side of the torque converter to the engine.

The transmission assembly may in use be mounted substantially midway between the front and rear differentials. This helps to reduce the polar moment of inertia of the vehicle and improves handling.

The front and rear propshafts can be of substantially equal length. This is particularly advantageous where rigid axles are used and both of the front and rear differentials form part of the unsprung weight of the vehicle.

Advantageously, the change speed transmission includes rotary drive components and selector components substantially identical to those produced for a change speed transmission used in a front wheel drive motor vehicle. This helps to reduce tooling costs and development time. Similarly, the change speed transmission may include a casing component substantially identical to one produced for a change speed transmission used in a front wheel drive motor vehicle.

Also novel and according to another aspect of the invention is a motor vehicle which incorporates a power train according to said one aspect of the invention. In such a motor vehicle, the transmission assembly can be housed partly within a tunnel or cavity in a floor of the motor vehicle. This minimises the effect of any intrusion into the passenger compartment. The tunnel or cavity may project upwardly between the foot wells for front and rear passengers, again minimising the effect of any intrusion into the passenger compartment.

The invention will now be described by way of example with reference to the accompanying drawings in which.

Figure 1:
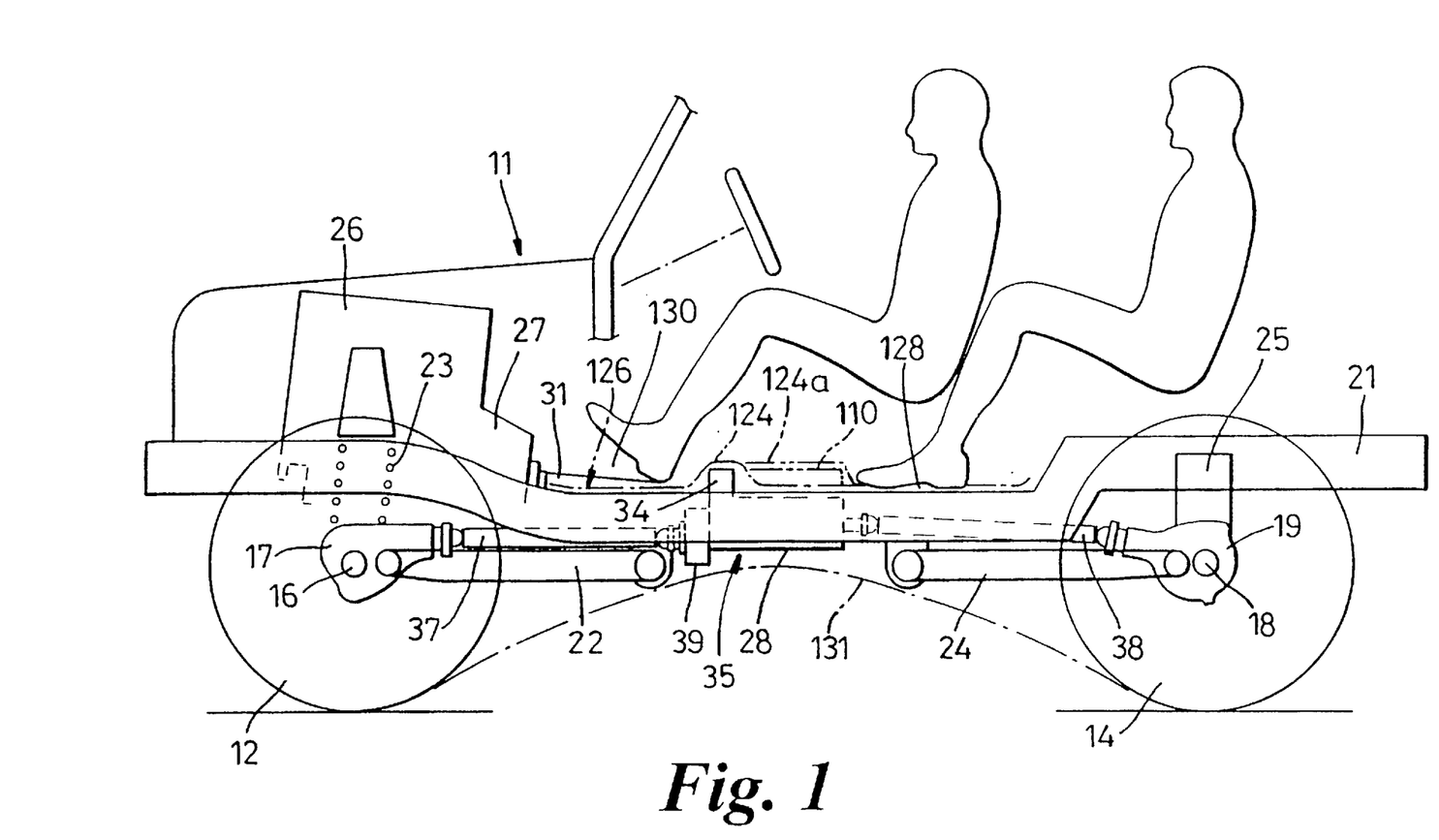
FIG. 1 is a diagrammatic side elevation of a motor vehicle incorporating a power train in accordance with the invention.
Figure 2:
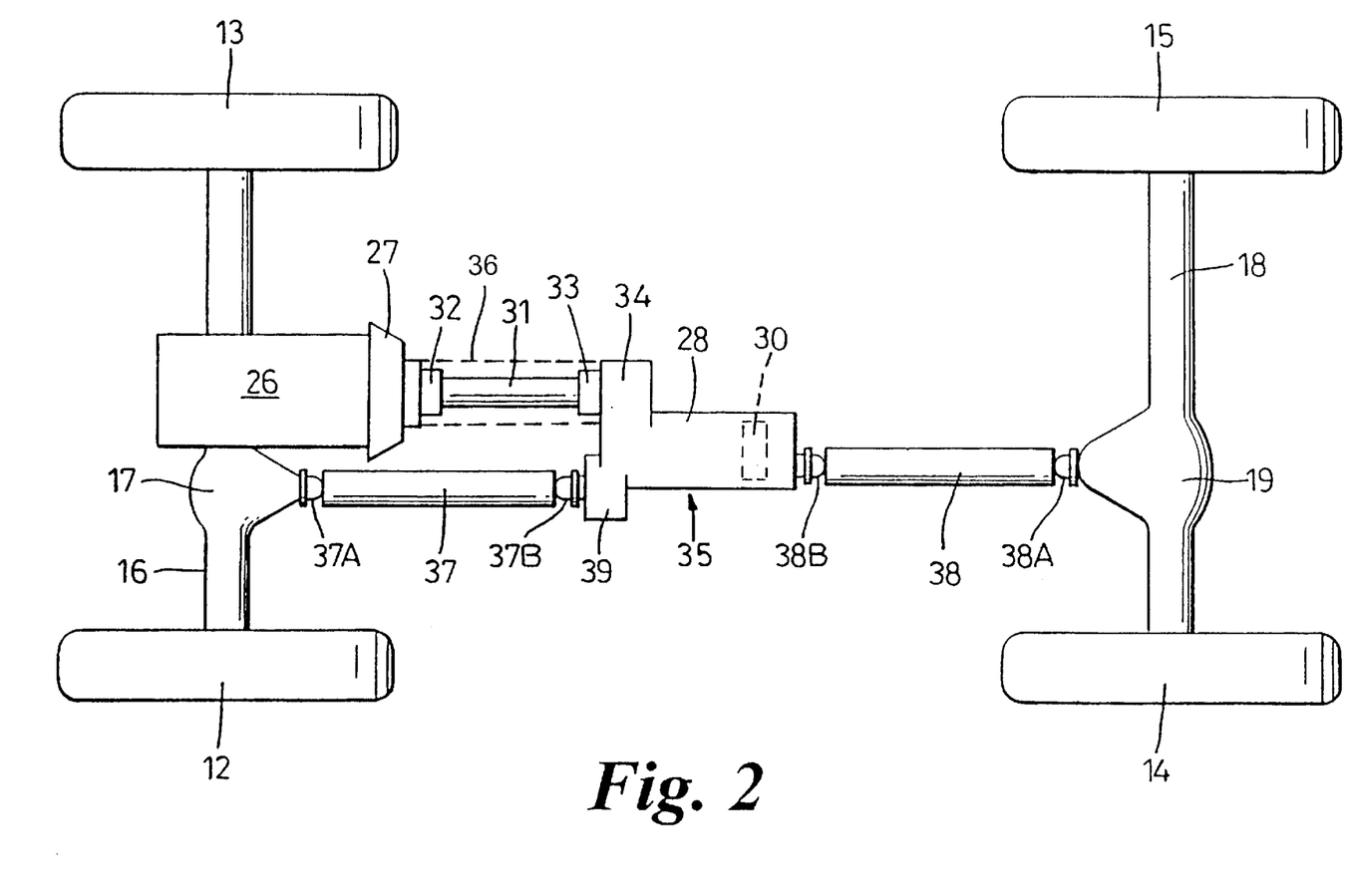
FIG. 2 is a plan view of the vehicle shown in FIG. 1 showing the power train and wheels of the vehicle.

In FIGS. 1 and 2, a motor vehicle 11 includes a pair of front wheels 12, 13 and a pair of rear wheels 14, 15. The front wheels 12, 13 are carried by a front axle 16 having a differential unit 17. Similarly, the rear wheels 14, 15 are carried by a rear axle 18 having a differential unit 19. The front axle 16 is suspended from a vehicle chassis 21 by means of leading links 22 and coil springs 23. The rear axle 18 is suspended from the chassis 21 by means of trailing links 24 and air springs 25.

The front and rear axles 16, 18 form part of a power train which also includes an engine 26, a bell housing 27 which covers a torque converter attached to a crankshaft of the engine 26 and a transmission assembly 35 mounted spaced from and independently of the engine 26. The transmission assembly 35 is drivably connected to the engine 26 by an input propshaft 31 having universal joints 32 and 33 arranged one each end, the rearmost joint 33 acting as a rotary input for the transmission assembly 35. The transmission assembly 35 includes an automatic change speed transmission 28 and a transfer transmission 30, drive from the input propshaft 31 being transmitted to the change speed transmission 28 through an input transmission 34 which will be described in more detail below. The transfer transmission 30 is drivingly connected to the front differential 17 by a front propshaft 37 having universal joints 37A and 37B and to the rear differential 19 through a rear propshaft 38 having universal joints 38A and 38B, the rearmost joint 37B of the front propshaft 37 acting as a front rotary output for the transmission assembly 35 and the front joint 38B of the rear propshaft 38 acting as a rear rotary output for the transmission assembly. Drive from the transfer transmission 30 to the front propshaft 37 is transmitted through an output transmission 39 which is also described in more detail below. It can be seen that the rotary input (universal joint 33) and the front and rear rotary outputs (universal joints 37B and 38B) are staggered or axially offset, i.e. their axes are offset from each other, the offset between the rotary input and the front rotary output being greater than that between the rotary input and the rear rotary output.

Figure 3:
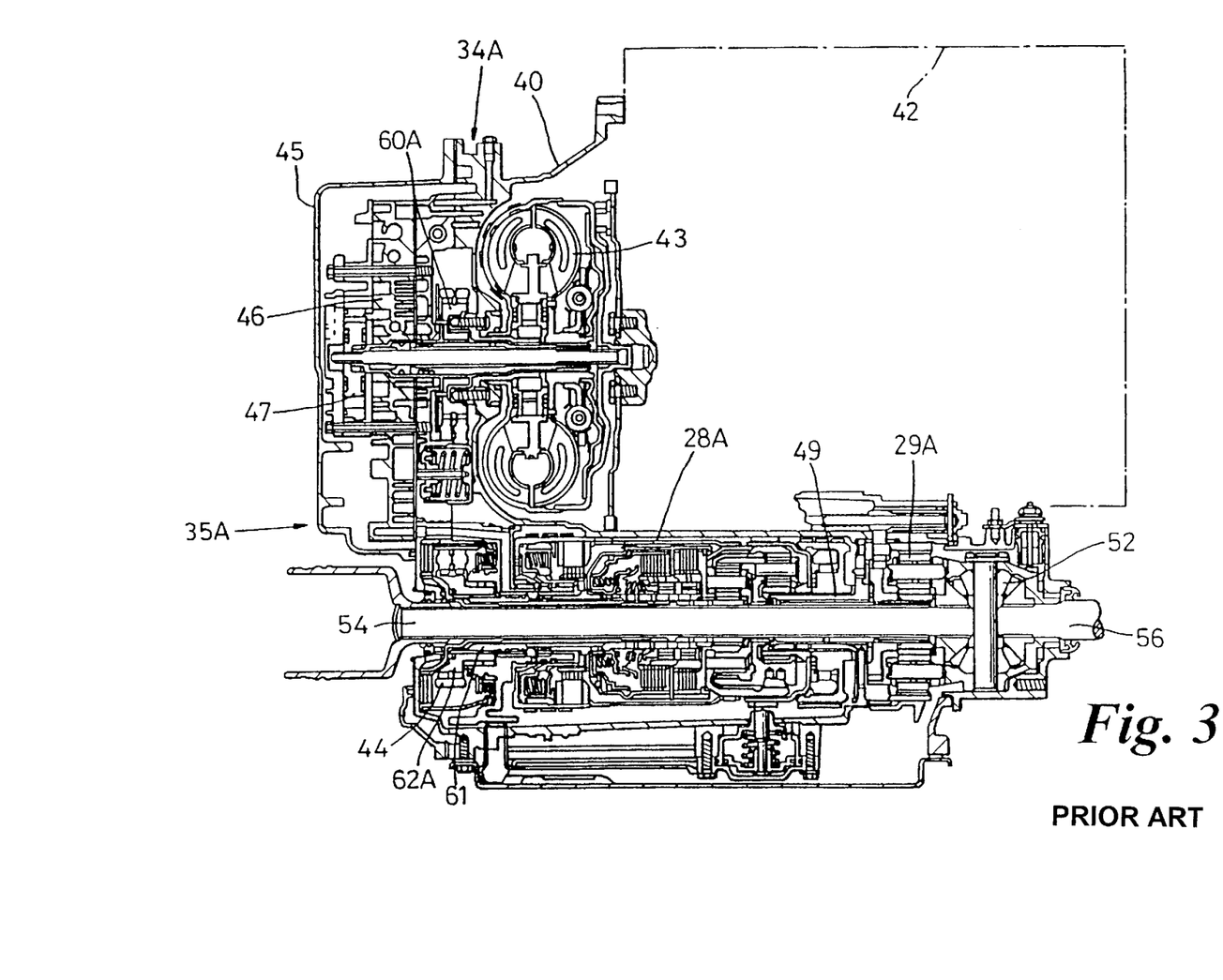
FIG. 3 is a cross-section of part of the drive train of an existing front wheel drive vehicle incorporating an automatic transmission assembly used for a front wheel drive vehicle and which is modified for use in the present invention.

The drive train of the existing transmission assembly 35A of a front wheel drive vehicle as shown in FIG. 3 comprises a bell housing 40 which is normally mounted on to an engine 42 and houses a torque converter 43. A housing 45 for a valve block 46 and a pump 47 is also mounted on the bell housing 40, the pump 47 receiving drive from the engine 42 in known manner. Drive from the torque converter 43 is transmitted by a driving sprocket 60A, a chain 44 and a driven sprocket 62A to the hollow input shaft 61 of an automatic change speed transmission 28A which contains a series of epicyclic gear trains, clutches and brakes which enable drive ratios for the vehicle to be selected in known manner. The change speed transmission 28A includes a hollow output shaft 49.

The transmission assembly 35A has an epicyclic final drive 29A which gives a required final drive ratio and transmits drive to a differential 52. A shaft 54 extends from one side of the differential 52 coaxially through the hollow output shaft 49 and other parts of the automatic change speed transmission 28A for driving a front wheel on one side of the vehicle and another shaft 56 extends from the other side of the differential for driving a front wheel on the other side of the vehicle.

The transmission assembly shown in FIG. 3 is modified as described below to form part of a power train in accordance with the present invention. The term "modification" will be understood to include design modification (for series production) as well as modification of actual components (for feasibility prototypes and very low volume production). In either case a number of rotary drive components and selector components (e.g. clutches and brakes) can be substantially identical to those used in the FIG. 3 transmission and it may also be possible to use casing components in this way.

Figure 4:
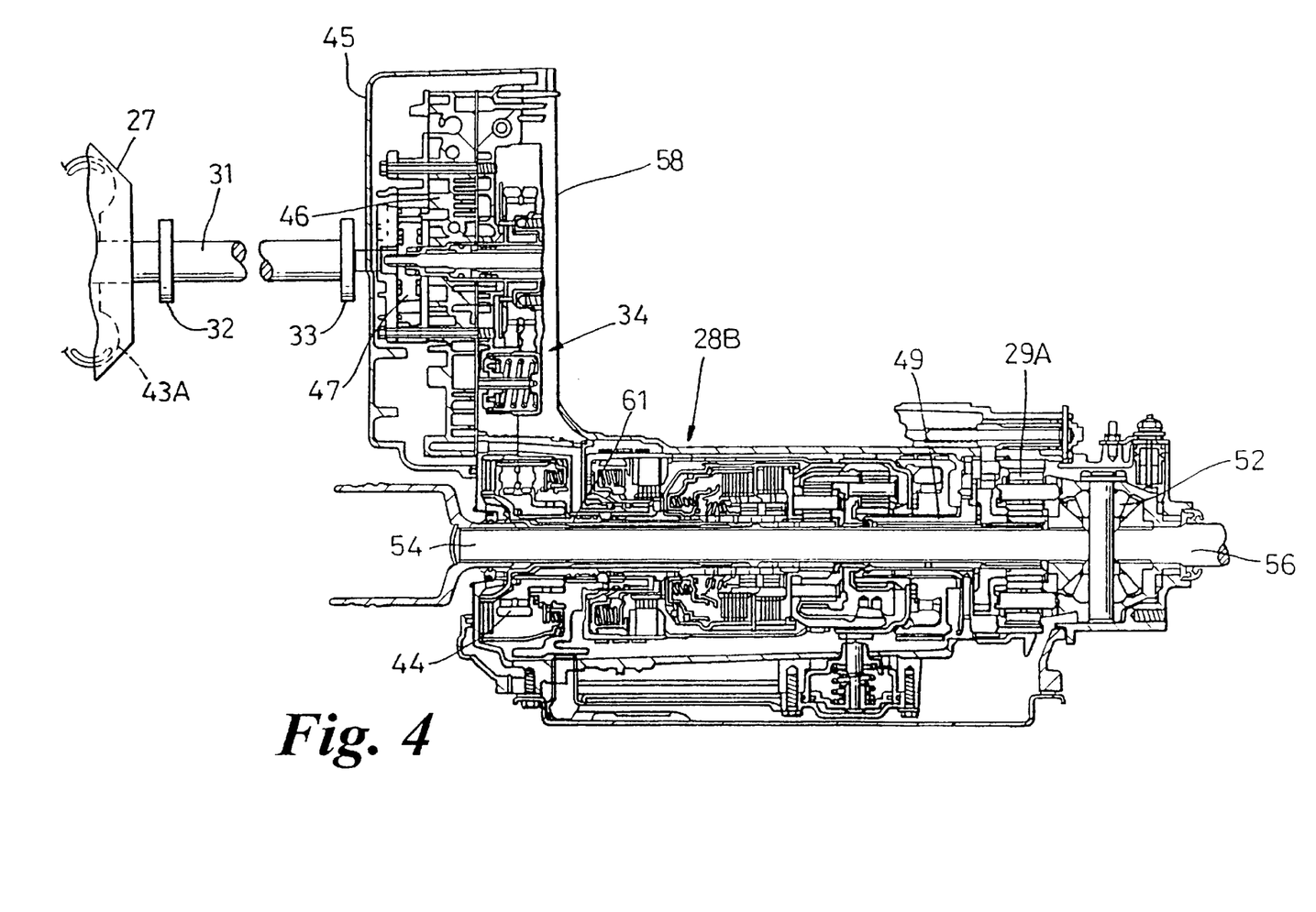
FIG. 4 is a longitudinal cross-section similar to FIG. 3 showing a first stage of modification.

FIG. 4 shows a first stage in the modification in which the torque converter 43 has been removed and an end cover 58 put in its place. A torque converter 43A is instead housed within the bell housing 27 and transmits drive through the input propshaft 31 so as to drive the pump 47 and the automatic change speed transmission 28B. The torque converter 43A is connected to the pump 47 and valve block 46 by pipes (not shown) and a muff coupling for operation of the usual lock-up clutch in the torque converter. The pump 47 may alternatively be replaced by another pump (not shown) driven directly by the engine or supplemented by an auxiliary engine driven pump.

Drive to the automatic change speed transmission 28B is transmitted through an input transmission 34A which comprises the driving sprocket 60A, the driven sprocket 62A and the chain 44. The shaft 54 is used to connect to the front propshaft 37 and the shaft 56 used to connect to the rear propshaft 38, the epicyclic final drive 29A and the differential 52 serving as a transfer transmission in which the differential 52 acts as a center differential to allow variations between the speeds of the front and rear wheels 12, 13, 14, 15.

Figure 5:
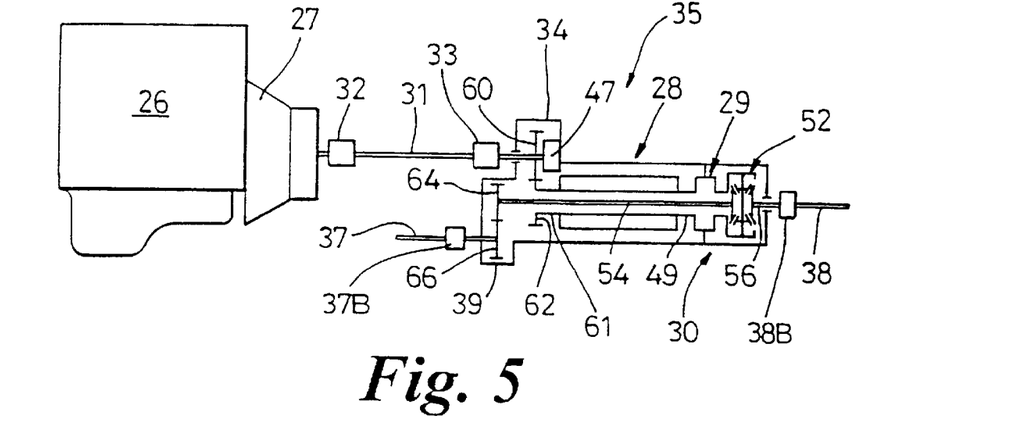
FIG. 5 is a diagrammatic view of the transmission assembly shown in FIG. 4 showing a final stage of modification for use in the present invention.

FIG. 5 shows diagrammatically the final stage of modification, this being the stage shown in the power train in FIGS. 1 and 2. The shaft 54 carries a gear 64 which meshes with a gear 66 drivably connected to the front propshaft 37 in substantially a 1:1 ratio, the gears 64, 66 providing the auxiliary output transmission 39. The shaft 56 driven by the differential 52 is drivably connected to the rear propshaft 38. It will be noted that the input transmission 34 and the output transmission 39 are arranged at the same end of the change speed transmission 28 and that instead of the chain 44 and sprockets 60A, 62A, the input transmission comprises meshing spur gears 60, 62.

Figure 6:
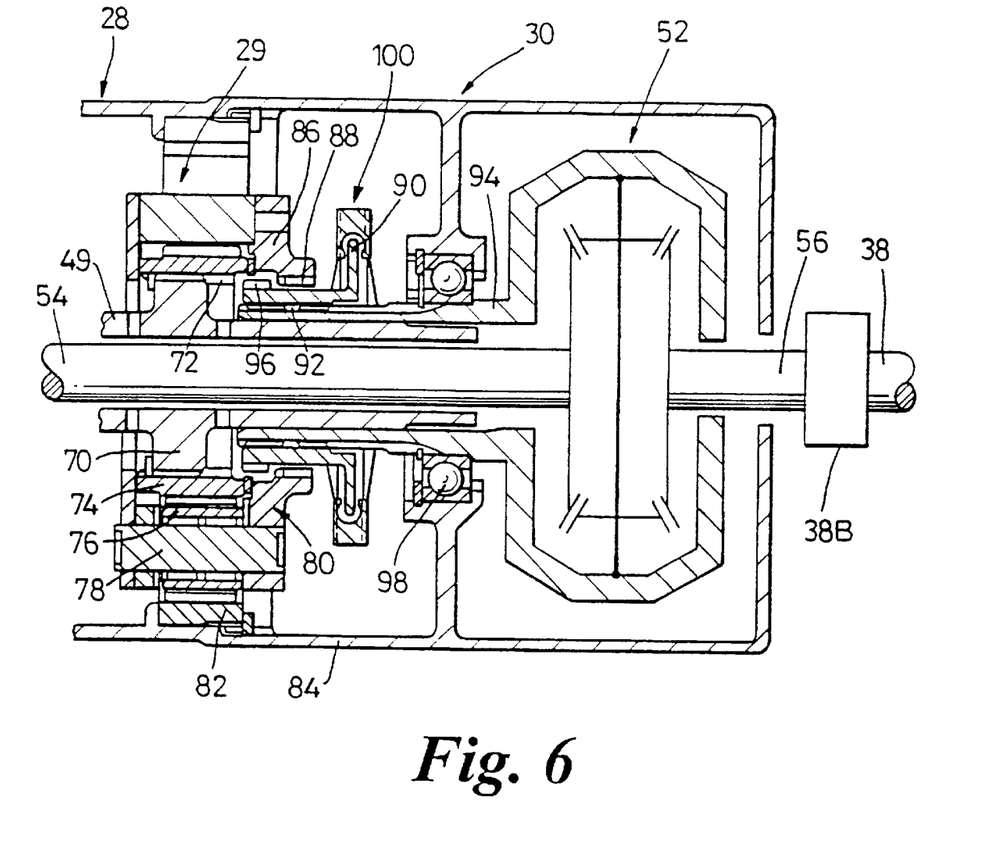
FIG. 6 is a cross-sectional view of the right hand end of the transmission assembly shown in FIG. 5 shown partly in diagrammatic form and illustrating a transfer transmission in more detail.

FIG. 6 shows in some detail the finally modified transfer transmission 30, particularly the epicyclic final drive 29.

In FIG. 6, the hollow output shaft 49 of the change speed transmission 28 has a portion 70 which is connected through splines 72 to a sun gear 74. The sun gear 74 meshes with a series of planet gears 76 which are mounted for rotation on pins 78 of a planet gear carrier 80. The planet gears 76 also mesh with an annulus gear 82 fixed to a casing 84 of the change speed transmission 28. The planet gear carrier 80 has an annular extension 86 formed with a circumferential row of axial splines 88 which, for convenience of manufacture, are identical to the splines 72. A selector member 90 is slidably mounted on splines 92 formed on a drive member 94 of the differential 52. The selector member 90 is formed with a circumferential row of splines 96 which can be slid optionally into engagement with the splines 72 on the sun gear 74 or with the splines 88 on the planet gear carrier 80. The drive member 94 is mounted for rotation in a bearing 98 on the housing 84. The differential 52 is of known kind and may be a limited slip type, e.g. a Torsen (Trade Mark). A suitable selector mechanism 100, part of which is shown in FIG. 6, is provided for shifting the selector member 90. Operation of the epicyclic final drive 29 will now be described.

With the transmission components stationary, drive in high range to the shafts 54, 56 is provided by shifting the selector member 90 to interengage the splines 72 and 96, drive from the hollow output shaft 49 being transmitted directly to the drive member 94. To provide a low range, the selector member 90 is shifted so as to interengage the splines 88 of the planet gear carrier 80 with the splines 96 of the selector member 90. In that way, drive from the hollow output shaft 49 will be transmitted through the planetary gearing and out through the planet gear carrier 80 via the selector member 90 so as to rotate the drive member 94 at a reduction ratio.

The epicyclic final drive 29 is readily adaptable from a known epicyclic transmission already used to provide high and low ranges on a four wheel drive vehicle.

In normal use of the vehicle, the auxiliary output transmission 39 applies torque to the front propshaft 37 in a direction which is opposite to that applied to the rear propshaft 38, i.e. they normally rotate in opposite directions. That is advantageous in that torque reaction from the front and rear propshafts 37, 38 is thereby cancelled. However, the auxiliary output transmission 39 could be arranged so that the front propshaft 37 to rotate in the same direction as the rear propshaft 38, e.g. by using sprockets and a chain similar to the input transmission 34A in FIG. 4 and modifying the gearing of the front differential 17.

Figure 7:
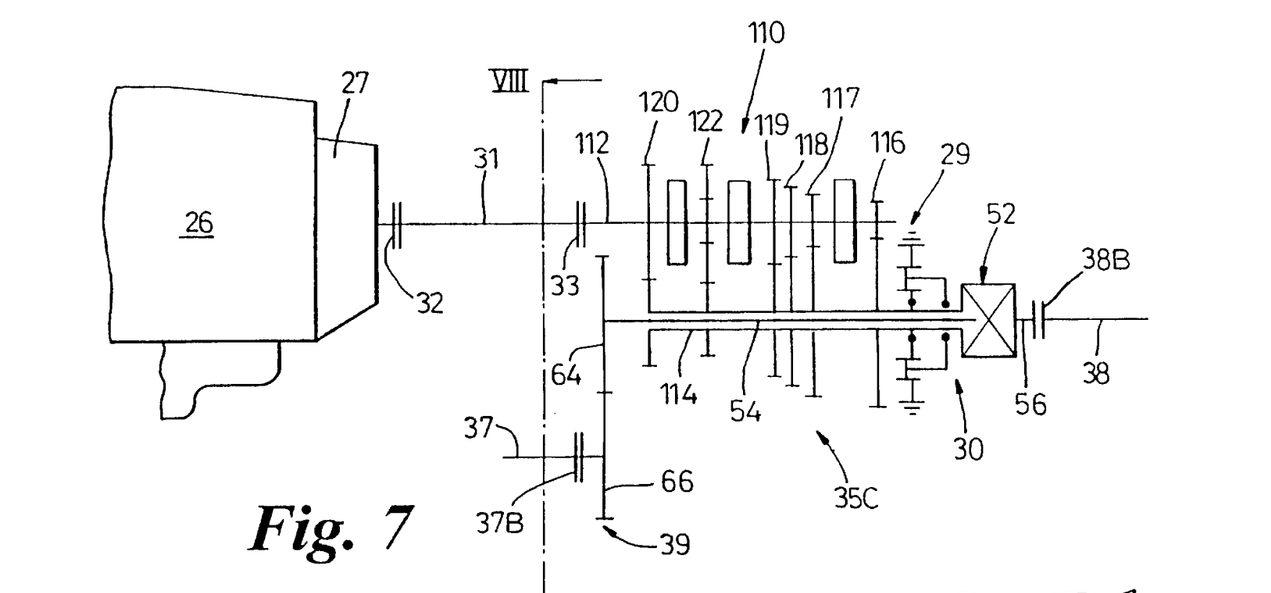
FIG. 7 is a diagrammatic cross-section showing a power train in accordance with the invention using a synchromesh type of change speed transmission.

Reference is now made to FIG. 7 which shows a modified transmission assembly 35C in which a synchromesh type of change speed transmission 110 is used instead of the epicyclic type automatic change speed transmission 28. Synchromesh transmissions are normally manually operated but, as is now well known, can be adapted for automatic or semi-automatic operation using servo-actuators. Parts in FIG. 7 which correspond to parts shown in FIGS. 1 to 6 carry the same reference numerals and will be not be described in detail.

In FIG. 7, the engine 26 transmits drive via a clutch (not shown) in the bell housing 27 and an input propshaft 31 having universal joints 32 and 33 arranged on each end. Rotating components of the change speed transmission 110 include an input shaft 112 and a hollow output shaft 114.

The change speed transmission 110 comprises first, second, third, fourth and fifth forward ratio constant mesh gear trains 116, 117, 118, 119 and 120 respectively and a reverse gear train 122. The reverse ratio is engaged by moving a reverse idler gear (not shown) into mesh. The forward ratios are selected by operating synchromesh clutches by means of a conventional selector mechanism (not shown). The hollow output shaft 114 acts as an input shaft for the transfer transmission 30 which may be similar to the transmission 30 shown in detail in FIG. 6. As in FIG. 6, the transfer transmission 30 includes a center differential 52 from which drive is transmitted to the front propshaft 37 via a shaft 54 passing through the hollow output shaft 114 and an auxiliary output transmission 39 comprising gear wheels 64, 66 as in FIG. 5. The center differential 52 also transmits drive to the rear propshaft 38.

The synchromesh type change speed transmission 110A can conveniently be substituted by other layshaft type transmissions, including constant mesh types with dog clutches or multiple friction clutches or continuously variable transmissions (CVTs) of the belt and pulley type. Similarly, the epicyclic type of automatic change speed transmission 28 can conveniently be replaced by a CVT of a type having concentric input and output shafts, e.g. a toroidal type such as the Torotrak (Trade Mark), modified as necessary to have a hollow output shaft and a hollow input shaft.

The transmission assembly 35 or 35C is preferably positioned longitudinally of the power train so that the front and rear propshafts 37, 38 are of substantially equal length. In that way, vibration and harshness caused or exacerbated by the use of excessively short propshafts is reduced and the service life of the associated universal joints can be increased. Moreover, by positioning the transmission assembly 35 or 35C substantially mid way between the axles 16 and 18, the polar moment of inertia of the vehicle can be reduced and the various components of the transmission can be packaged to provide good ground clearance without undue difficulty. In that respect, reference is again made to FIG. 1.

Looking at FIG. 1, it will be noted that by placing the transmission assembly 35 or 35C at the mid-point of the vehicle, a tunnel or cavity 124 formed in a floor 126 for receiving the auxiliary input transmission 34 of the automatic change speed transmission will be positioned well forward of a rear passenger foot well 128 and will not intrude into a front passenger foot well 130. That feature is particularly advantageous from the point of view of passenger leg room and comfort. Also, the auxiliary output transmission 39 can be positioned outside a ground clearance curve indicated at 131 which is most advantageous from the point of view of maintaining optimum ground clearance for the vehicle. The synchromesh transmission 110 of FIG. 7 is shown in broken outline and it will be seen that a cavity or tunnel 124a needed to clear the transmission 110 does not intrude into the footwells 128, 130.

By spacing the transmission assembly 35 or 35C from the engine 26 and bell housing 27, there is greater space available for the packaging of engine auxiliaries, particularly exhaust components. In particular, a catalytic converter can be positioned close to the engine 26, i.e. with only a short intermediate length of pipe, so that it can reach its operational temperature much sooner than if it is positioned further from the engine. A further advantage is that mountings for the engine 26 are required to absorb engine torque only. However, in a modification, the bell housing 27 and the casing of the transmission assembly 35 or 35C are connected by a tubular housing 36 (shown in dashed lines in FIG. 2) which surrounds the input propshaft 31. This eliminates the need for universal joints 32, 33. The staggering of the front and rear propshafts 37, 38 as will be appreciated from FIGS. 2 and 5 is also useful from the point of packaging.

Instead of positioning the torque converter 43A within the bell housing 27, it may be incorporated in the transmission assembly 35A as shown in FIG. 3 with the casing adapted accordingly. Drive from the engine 26 will be transmitted to the torque converter 43 through the input propshaft 31 and a shaft concentric with the pump 47. Alternatively, the torque converter and the pump and valve block can be transposed so that the pump and valve block are on the opposite side of the torque converter to the engine.

In FIG. 5, the input transmission 34 comprises meshing gears 60, 62. Instead of using meshing gears, it is envisaged that a chain drive may be used provided that the transmission 28 will finally provide a drive output in the correct rotational direction for the vehicle.

Figure 9:
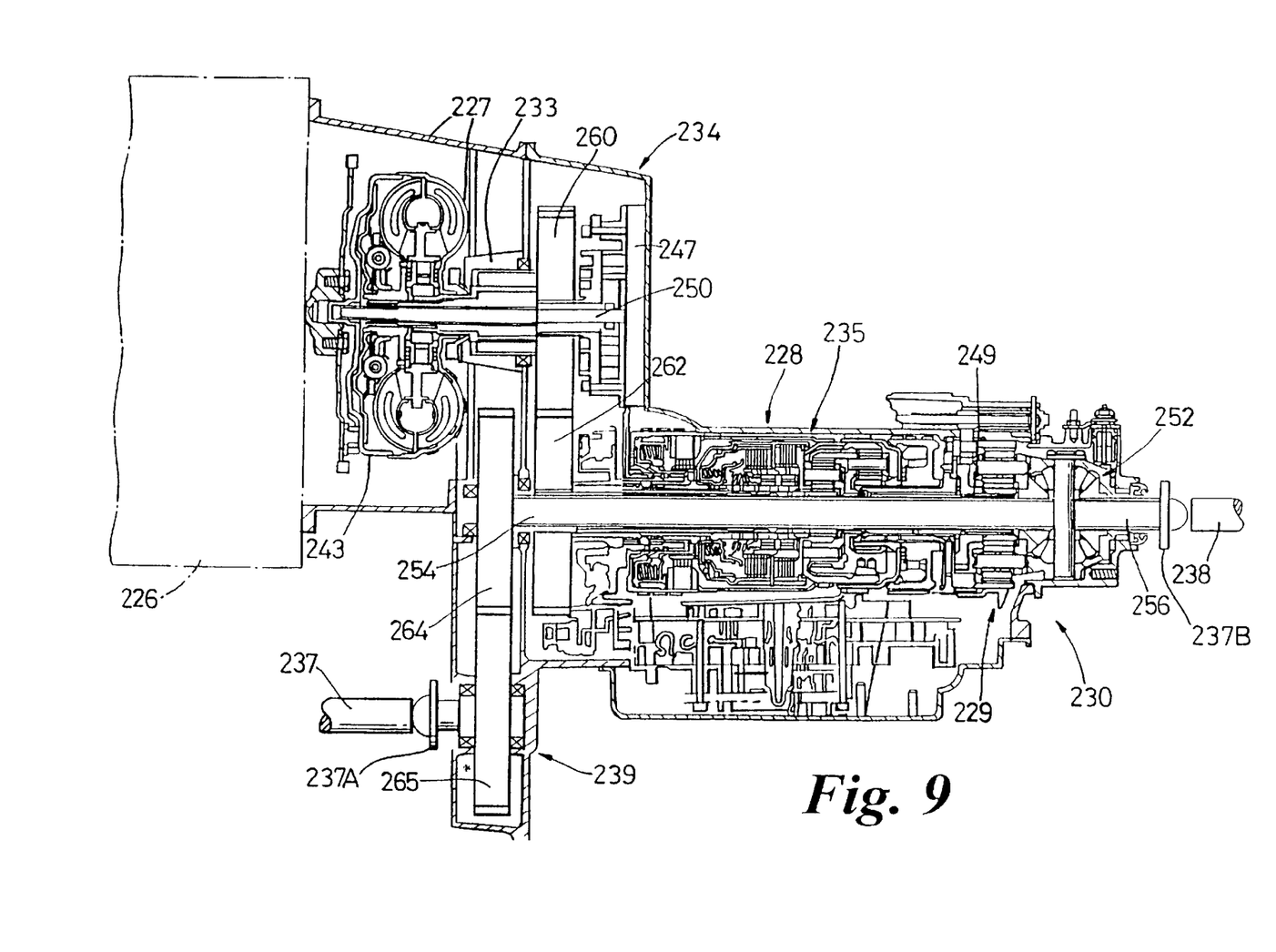
FIG. 9 is a longitudinal cross section of a transmission assembly somewhat similar to that shown in FIG. 4 but showing the transmission assembly mounted on a housing of a torque converter.
Figure 10:
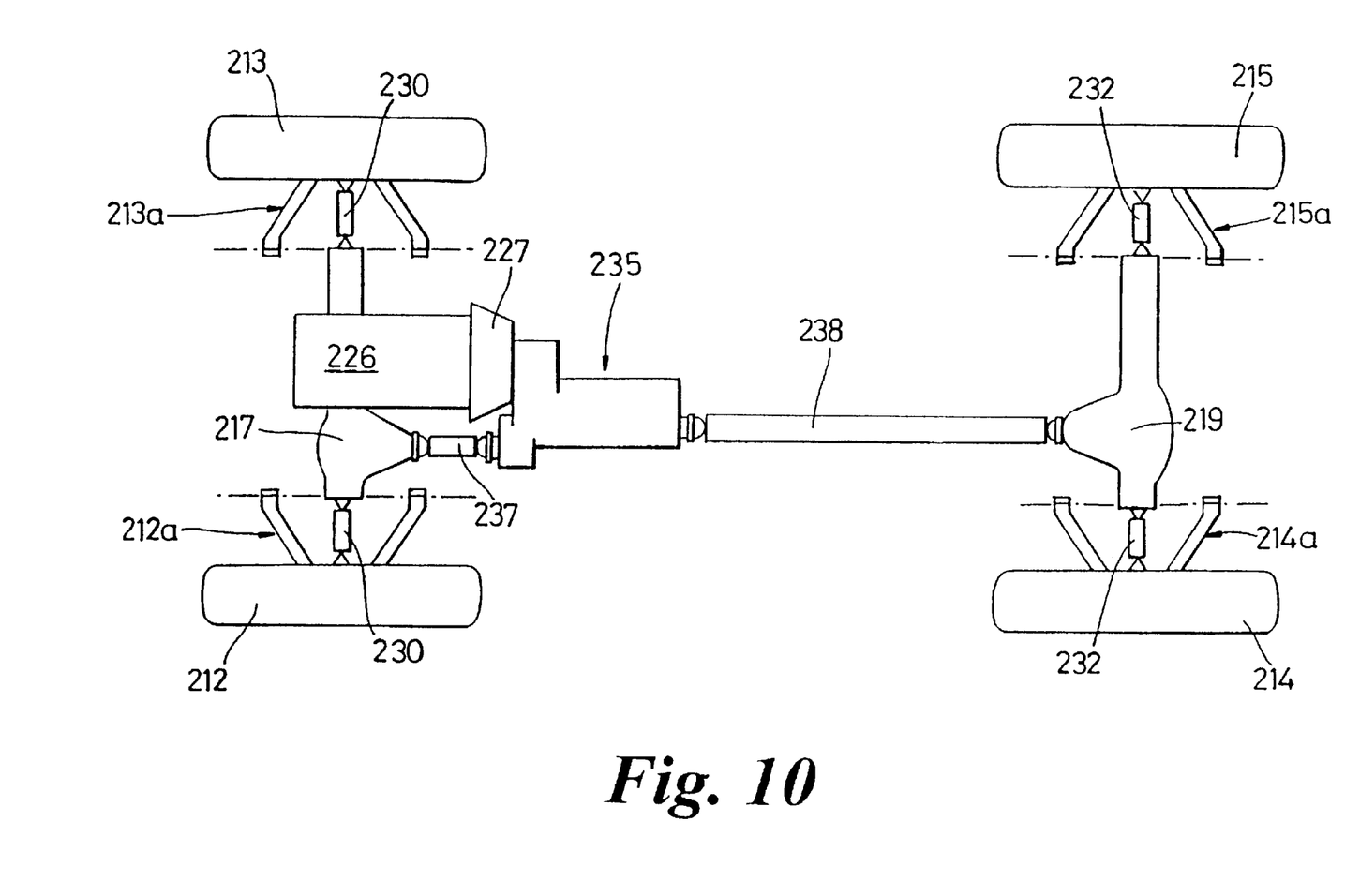
FIG. 10 is a plan view of a vehicle having the transmission assembly shown in FIG. 9.

Reference is now made to FIGS. 9 and 10 in which parts corresponding to parts shown in FIGS. 1 to 6 carry the same reference numerals with the addition of 200 and are not described again in detail.

In FIGS. 9 and 10, the transmission assembly 235 is mounted on a bell housing 227 for a torque converter 243 instead of being spaced therefrom and connected thereto by the input propshaft 31. The torque converter 243 drives a tubular input shaft 233 which acts as the rotary input to the transmission assembly, the pump 247 being engine driven through a concentric shaft 250. First and second meshing gears 260, 262 provide the input transmission to the change speed transmission 228. As before, the automatic change speed transmission 228 contains a series of gear trains clutches and brakes to enable drive ratios for the vehicle to be selected in known manner. The change speed transmission 228 transmits drive through a hollow output shaft 249 as FIG. 4 to an epicyclic transfer transmission 229 which in turn transmits drive to a differential 252. The differential 252 drives a shaft 254 extending coaxially through the hollow output shaft 249 and through the remainder of the change speed transmission 228 for driving a front differential 217 via gears 264, 265 and a front propshaft 237. The differential 252 also drives a shaft 256 which transmits drive to a rear differential 219 via a rear propshaft 238. The front differential 217 transmits drive through front driveshafts 230 for driving front wheels 22, 23 and the rear differential 29 transmits drive through rear driveshafts 232 for driving rear wheels 214, 215. The front and rear differentials 217, 219 are mounted on a body or chassis of the vehicle and the front and rear wheels 212, 213, 214 and 215 are carried by respective independent suspensions 212a, 213a, 214a and 215a. It will be noted from FIG. 10 that the front propshaft 237 is shorter than the rear propshaft 238, this not being a disadvantage in a vehicle having independent suspension where the front and rear differentials are mounted on the body or chassis of the vehicle. If desired, the meshing gears 260, 262 and 264, 265 can be replaced by respective chain drive arrangements as described above with respect to FIG. 5.

Figure 8:
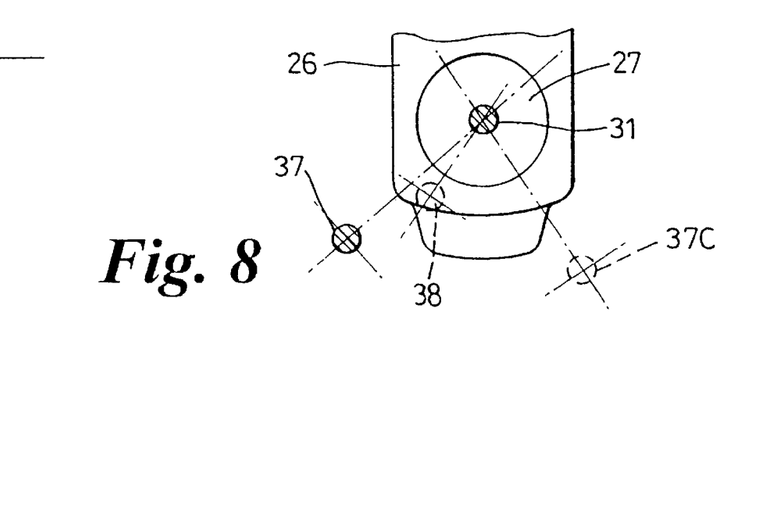
FIG. 8 is a diagrammatic cross-section through part of the power train shown in FIG. 7, generally on the line VIII—VIII.

For packaging convenience, the input propshaft 31 or the tubular input shaft 233 and the front and rear propshafts 37 or 237, 38 or 238 will normally be disposed somewhat as shown in FIG. 8, this further illustrating the staggering or axial offset between the rotary input and the front and rear rotary outputs and showing that the front rotary output to the front propshaft 37 or 237 is offset by a greater amount than that of the rear rotary output to the rear propshaft 38 or 238.

Depending upon the design of the particular vehicle in which the power train is to be installed, the outputs may be disposed to the other side of the vehicle, as illustrated in FIG. 8 by an alternative front propshaft 37C, shown dotted. Also, instead of the center differential 52 or 252 could be at the same end of the transmission assembly as the auxiliary output transmission 39, 239 so that the rear differential output shaft 56 or 236 extends through the hollow output shaft 49 or 114.

We claim:

1. In a motor vehicle having a pair of front wheels and a pair of rear wheels, a power train comprising:
    an engine which, in use, is mounted longitudinally in the vehicle adjacent a front end thereof;
    a front differential disposed, in use, between the front wheels and drivably connected thereto;
    a rear differential disposed, in use, between the rear wheels and drivably connected thereto;
    a transmission assembly mounted intermediate and spaced from the front and rear differentials, the transmission assembly having a rotary input drivably connected to the engine, a front rotary output drivably connected to the front differential and a rear rotary output drivably connected to the rear differential;
    a front propshaft drivably connecting the front rotary output to the front differential; and
    a rear propshaft drivably connecting the rear rotary output to the rear differential;
    said transmission assembly comprising;
        a change speed transmission having an input shaft for receiving drive from the rotary input and a hollow output shaft;
        a transfer transmission comprising a center differential which is drivably connected to the hollow output shaft, has a front differential output shaft for transmitting drive to the front rotary output and a rear differential output shaft for transmitting drive to the rear rotary output, whereby one of the differential output shafts extends co-axially through the hollow output shaft;
        an auxiliary output transmission in the drive from the front differential output shaft to the front rotary output; and
        the transmission assembly being arranged so that the front and rear rotary outputs are axially offset from the rotary input, the offset of the front rotary output being greater than that of the rear rotary output.

2. The power train according to claim 1, in which the change speed transmission is co-axial with the hollow output shaft, the transmission assembly further comprising an input transmission which is adapted to transmit drive from the drive input to the input shaft of the change speed transmission.

3. The power train according to claim 2, in which the input transmission and the auxiliary output transmission are arranged at the same end of the transmission assembly.

4. The power train according to claim 2, in which the change speed transmission is an epicyclic automatic transmission.

5. The power train according to claim 1, in which the change speed transmission is a layshaft transmission having an input shaft co-axial with the rotary input and axially offset from the hollow output shaft.

6. The power train according to claim 5, in which the change speed transmission is a constant mesh transmission.

7. The power train according to claim 1, in which the transfer transmission includes an epicyclic final drive having a sun gear connected to the hollow output shaft and a planet gear carrier for transmitting drive to the center differential.

8. The power train according to claim 7, in which the epicyclic final drive provides a plurality of selectable ratios.

9. The power train according to claim 1 and further comprising an input propshaft and wherein the transmission assembly is spaced from the engine and the rotary input is connected to the engine by the input propshaft.

10. The power train according to claim 9, and further comprising a drive coupling in the drive between the engine and the transmission assembly, the drive coupling being mounted on the engine so as to be operable to transmit drive to the transmission assembly through the input propshaft.

11. The power train according to claim 10 and further comprising a bell housing on the engine and in which the drive coupling is mounted and a tubular housing which surrounds the input propshaft and connects the bell housing to the transmission assembly.

12. The power train according to claim 9, in which the transmission assembly further comprises a drive coupling in the drive between the engine and the change speed transmission.

13. The power train according to claim 12, in which the drive coupling is a torque converter and the transmission assembly further comprises a pump for the change speed transmission and which is located on the opposite side of the torque converter to the engine.

14. The power train according to claim 1, in which the transmission assembly is in use mounted substantially midway between the front and rear differentials.

15. The power train according to claim 1, in which the front and rear propshafts are of substantially equal length.

16. The power train according to claim 1, in which the change speed transmission includes rotary drive components and selector components substantially identical to those produced for a change speed transmission used in a front wheel drive motor vehicle.

17. The power train according to claim 16, in which the change speed transmission includes a casing component substantially identical to one produced for a change speed transmission used in a front wheel drive motor vehicle.

18. A motor vehicle having a pair of front wheels, a pair of rear wheels and a power train comprising:

an engine which, in use, is mounted longitudinally in the vehicle adjacent a front end thereof;

a front differential disposed, in use, between the front wheels and drivably connected thereto;

a rear differential disposed, in use, between the rear wheels and drivably connected thereto;

a transmission assembly mounted intermediate and spaced from the front and rear differentials, the transmission assembly having a rotary input drivably connected to the engine a front rotary output drivably connected to the front differential and a rear rotary output drivably connected to the rear differential;

a front propshaft drivably connecting the front rotary output to the front differential; and a rear propshaft drivably connecting the rear rotary output to the rear differential;

said transmission assembly comprising:

a change speed transmission having an input shaft for receiving drive from the rotary input and a hollow output shaft;

a transfer transmission comprising a center differential which is drivably connected to the hollow output shaft, has a front differential output shaft for transmitting drive to the front rotary output and a rear differential output shaft for transmitting drive to the rear rotary output, whereby one of the differential output shafts extends co-axially through the hollow output shaft;

an auxiliary output transmission in the drive from the front differential output shaft to the front rotary output; and the transmission assembly being arranged so that the front and rear rotary outputs are axially offset form the rotary input, the offset of the front rotary output being greater than that of the rear rotary output.

19. The motor vehicle according to claim 18 and further comprising a floor which defines a tunnel in which the transmission assembly is partly housed.

20. The motor vehicle according to claim 19, in which the floor defines footwells for front and rear passengers and the tunnel projects upwardly between the footwells.

* * * * *